Patented July 25, 1950

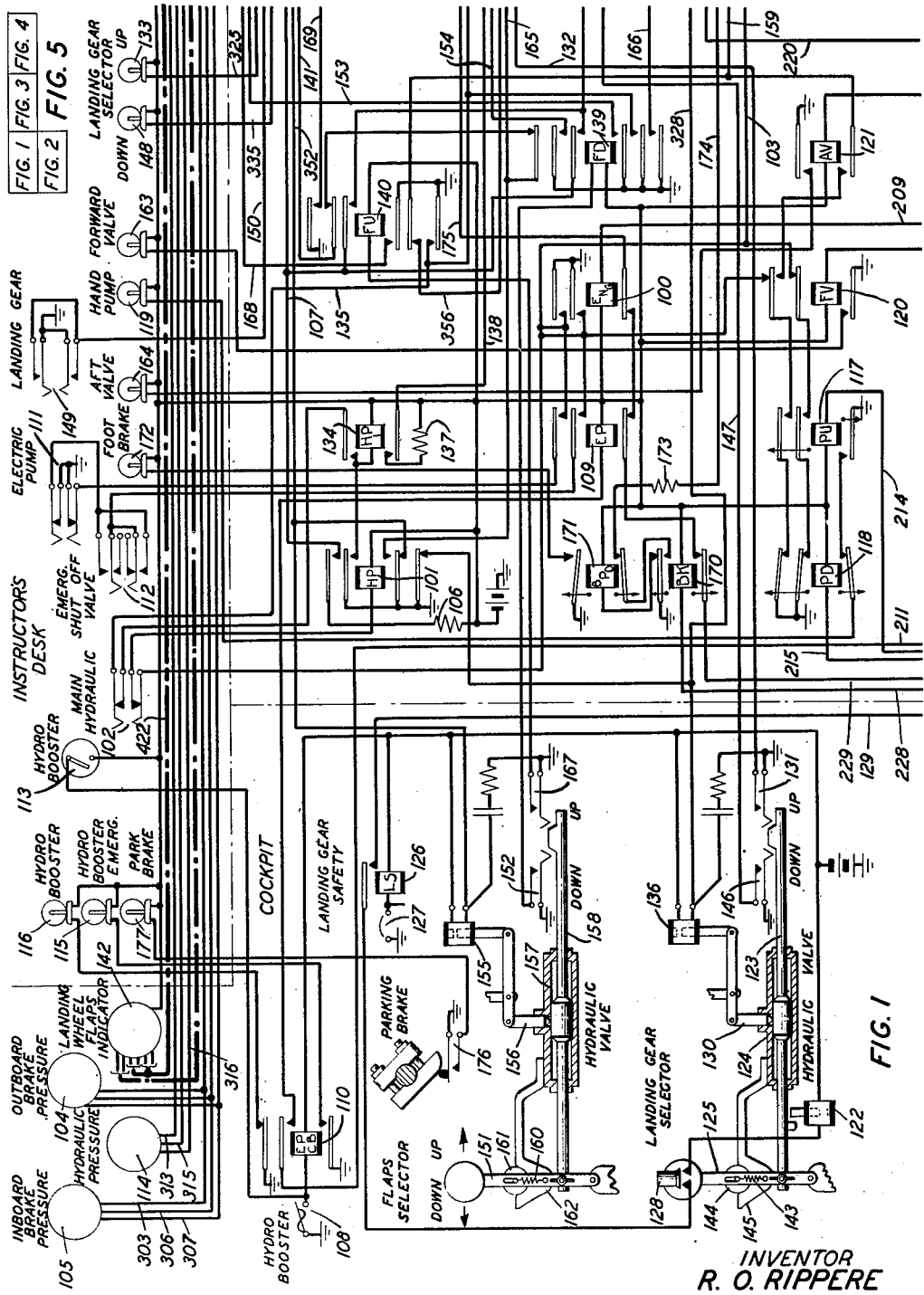

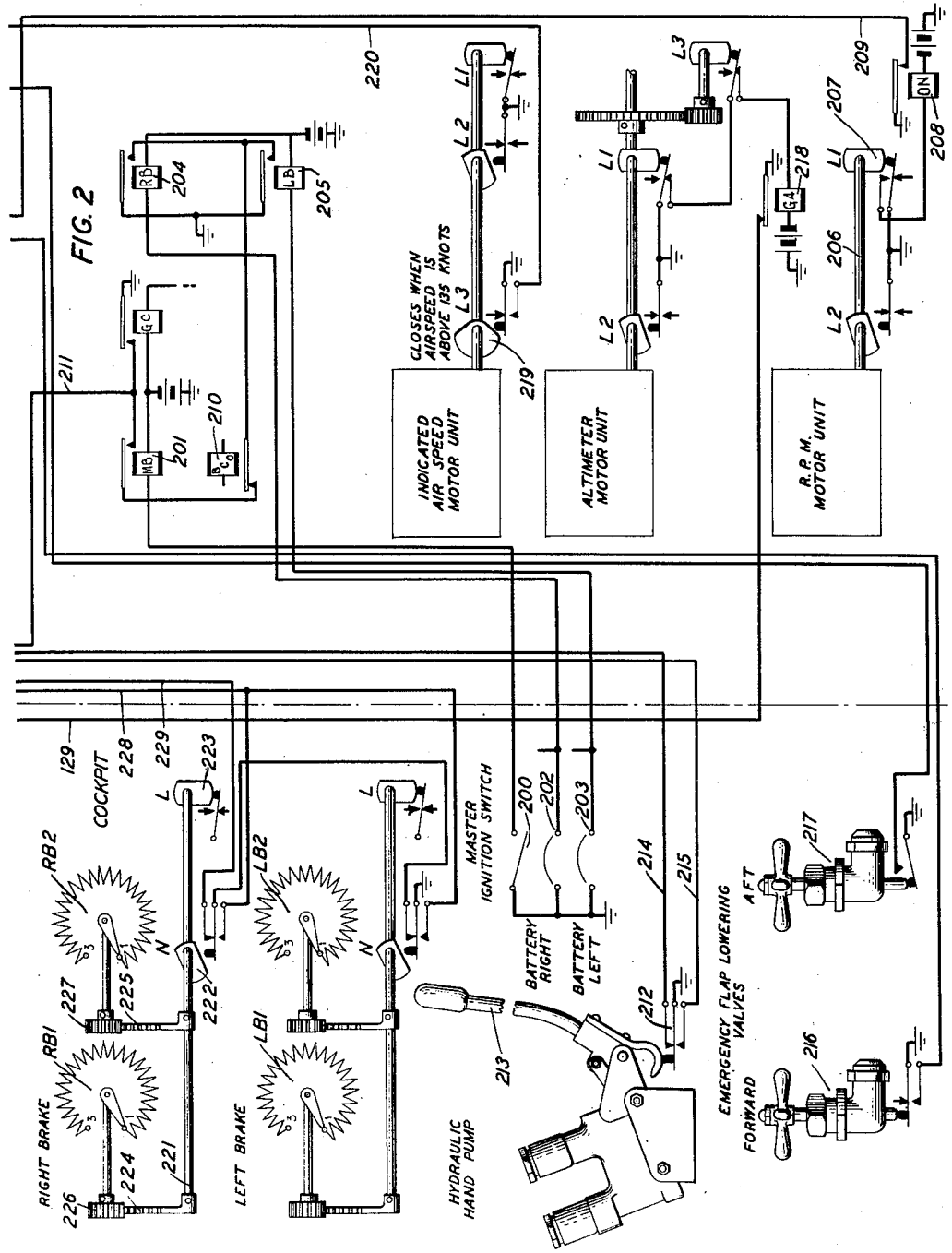

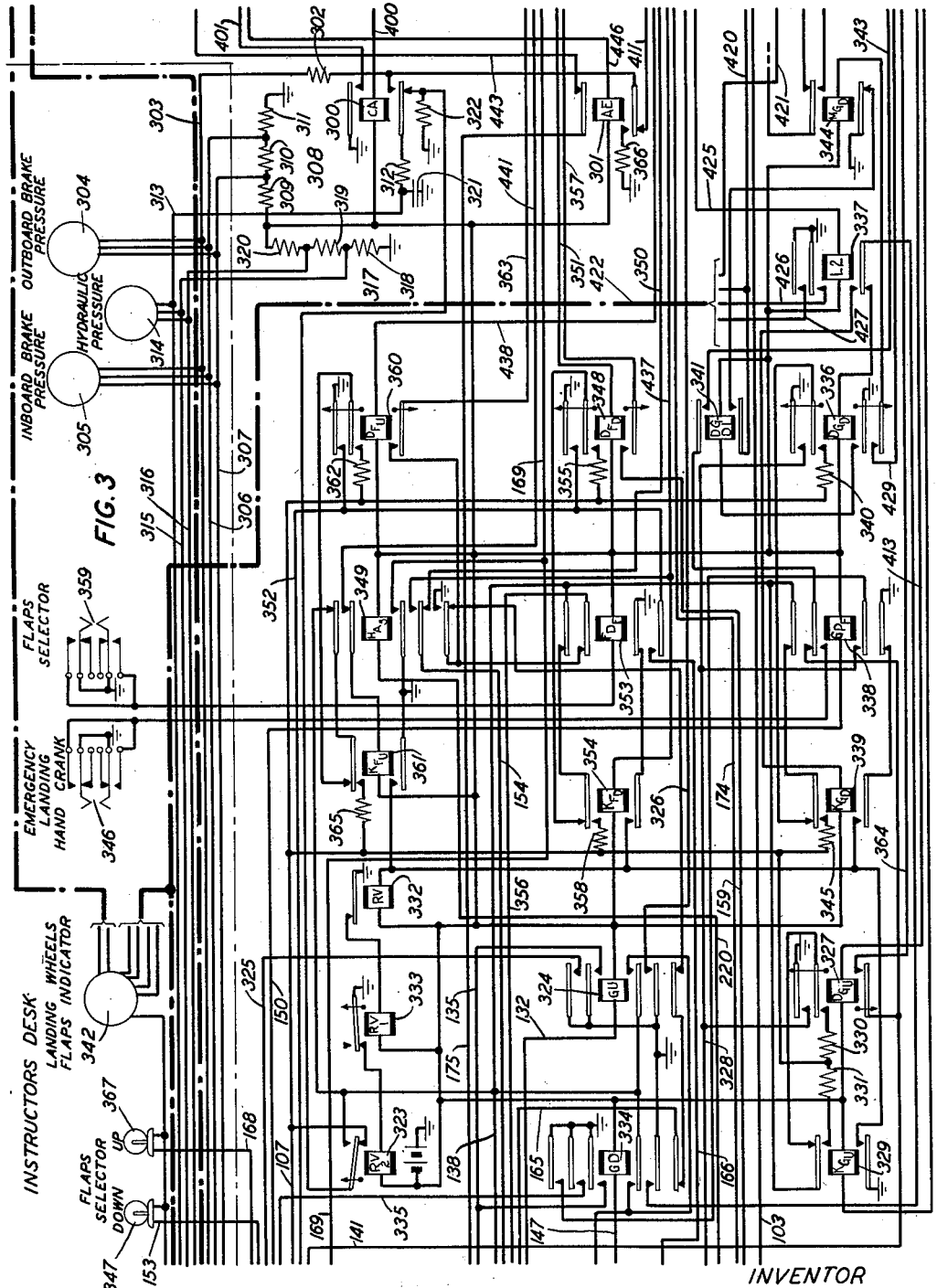

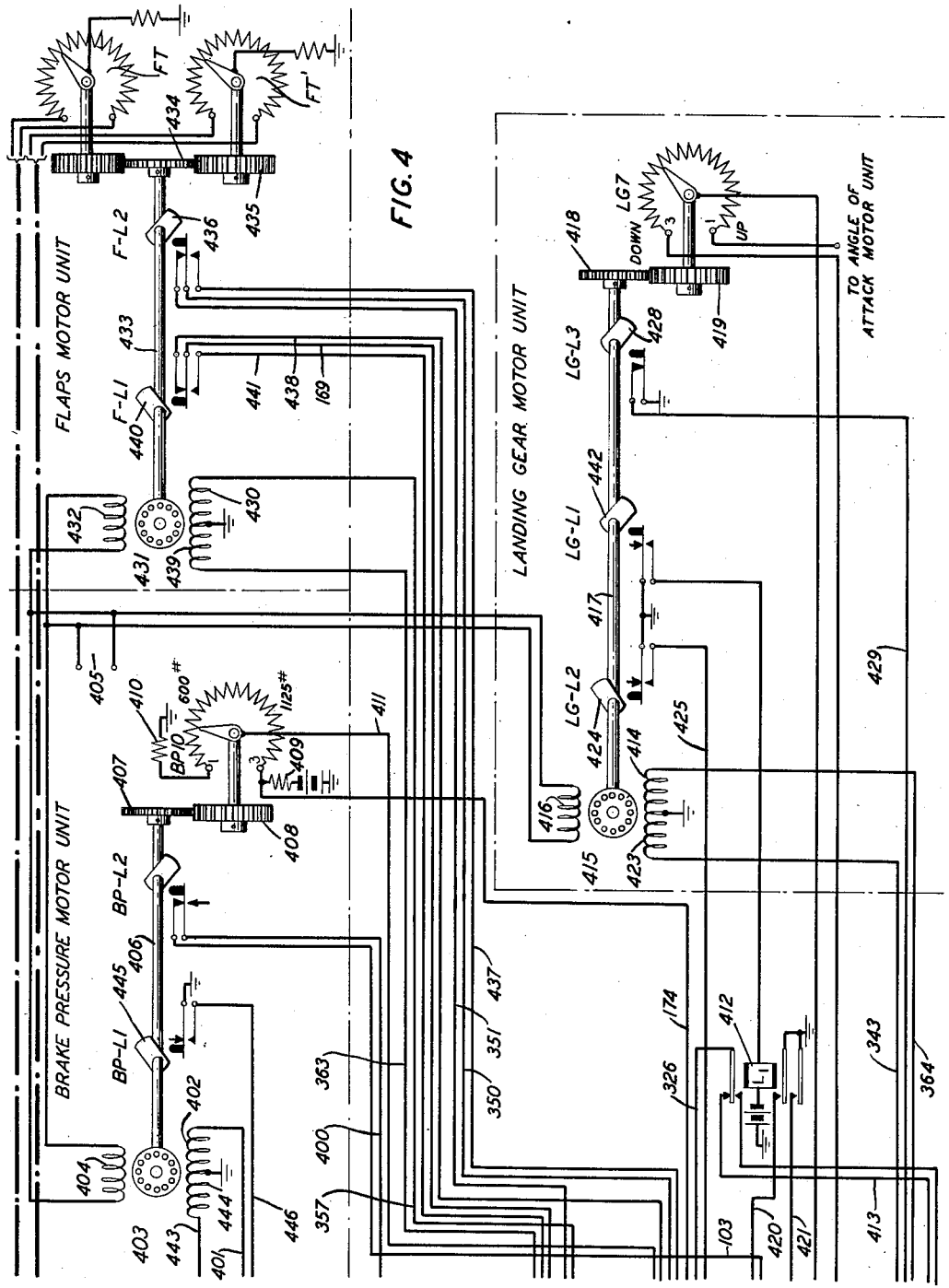

2,516,803

UNITED STATES PATENT OFFICE 2,516,803

GROUND TRAINER FOR AIRCRAFT FLIGHT PERSONNEL

Robert O. Rippere, Massapequa, N. Y., assignor to Bell Telephone Laboratories, Incorporated, New York, N. Y., a corporation of New York Application June 14, 1946, Serial No. 676,603

20 Claims. (Cl. 35—12)

This invention relates to a ground trainer for aircraft flight personnel and more particularly to circuits and apparatus which simulate the hydraulic system of an airplane and the functioning of apparatus of an airplane which is operated by hydraulic pressure applied from the hydraulic system.

In an airplane of the type which the trainer of the present invention is designed to simulate a mixed open-center and constant pressure type of hydraulic system is provided. The open-center portion of the system is used to raise and lower the landing gear, to open and close the bomb bay doors, and to extend and retract the wing flaps. The constant pressure portion of the system is used for the brakes, for the emergency operation of the bomb doors, for the automatic pilot and to operate the windshield wipers.

An unloader valve directs hydraulic fluid from the open-center system to the constant pressure system when the accumulated pressure for the latter drops below 850 pounds per square inch.

Normally fluid is pumped from a reservoir through a supply line forming a part of the open-center system through check valves to the two accumulators of the constant pressure portion of the system which supply pressure for operating the right and left brakes respectively, and to an unloader valve. When the pressure in the accumulators reaches 1,050 pounds per square inch, the unloader valve functions to extend the supply line in a loop through the bomb bay door selector valve, through the wing flap selector valve and through the landing gear selector valve back to the reservoir thereby completing the open-center portion of the system. The pressure in the open-center system then falls to about 50 pounds per square inch until one of the selector valves is operated whereupon it will build up to a value required to operate the mechanism controlled by such valve. When the pressure in the accumulators falls to 850 pounds per square inch the unloader valve functions to disconnect the supply line from the selector valves whereupon the pressure in the accumulators will again build up.

The selector valves are so constructed that when one of them, for example, the landing gear selector valve, is operated to one of its control positions, as to retract the landing gear, the engine pump side of the open-center system becomes disconnected from the fluid reservoir and connected to the ports of the landing gear operating cylinders required to move the pistons to raise the landing gear. For this purpose the pressure will build up to about 800 pounds per square inch. After the landing gear has been moved to its full up position the pressure in the valve will continue to build up to about 1,040 pounds per square inch when it is effective to operate a hydraulic detent in the valve to release the valve stem which then returns under spring tension to its neutral position, and the pressure supply line from the pump becomes reconnected to the fluid reservoir and the pressure in the open-center system then again drops to 50 pounds per square inch.

An auxiliary electrically driven pump may be used either for charging the accumulators only, or to operate the entire hydraulic system. When the emergency cross-over valve is closed fluid flows from the auxiliary pump directly to the accumulators and under this condition the pump is governed by a pressure switch which maintains the accumulator pressures between 975 and 1,140 pounds per square inch. Opening this valve allows fluid to flow to the unloader valve either supplementing or replacing the flow from the pump driven by the No. 3 engine.

An emergency hand pump may be used to furnish fluid pressure to lower the wing flaps or to operate the entire hydraulic system. A relief valve is also provided to prevent the pressure from exceeding 1,250 pounds per square inch.

It is an object of the invention to simulate in a trainer the functioning of the hydraulic system of an airplane of the type just described.

It is a further object of the invention to simulate in a trainer by electrical means the functioning of the hydraulic system of an airplane during the operation of the landing gear, wing flaps and brakes under regular, auxiliary and emergency conditions.

These and other objects pertinent thereto are attained by the structure set forth in the appended claims and discussed in the following detailed description when read in connection with the accompanying drawings in which:

Fig. 1 discloses in the left portion thereof indicators on the pilot's instrument panel, landing gear control lever, wing flaps control lever and parking brake lever; in the box in the upper portion thereof signal lamps and control keys at the instructor's desk and in the remainder of the figure some of the relays and circuits which simulate the functioning of the hydraulic system of an airplane in response to controls operated by the pilot and by an instructor;

Fig. 2 discloses in the left portion thereof switches and potentiometers operable in response to the operation of the brake pedals situated in front of the pilot's and copilot's seat, the hydraulic hand pump located at the right of the copilot's seat, the master ignition switch located above the pilot's pedestal, the battery switches on the copilot's power panel at the right of his seat and the forward and aft emergency flap lowering valves located at the right of the copilot's seat; in the upper right portion thereof relays controllable by the ignition and battery switches and representations of the indicated air speed motor unit, altimeter motor unit and the R. P. M. motor unit corresponding to one of the simulated engines;

Fig. 3 discloses in the upper portion thereof other controls, signal lamps and indicators at the instructor's desk, which indicators are operated in parallel with similar indicators on the pilot's instrument panel and in the remainder of the figure the remaining relays and circuits which simulate the functioning of the hydraulic system of an airplane in response to controls operated by the pilot and by the instructor and in response to the operation of the motor units of Fig. 4;

Fig. 4 discloses the motor unit which simulates the production of pressure in the constant pressure portion of the hydraulic system and the motor units which simulate the wing flaps and landing gear hydraulic mechanisms; and Fig. 5 is a chart showing how Figs. 1 to 4, inclusive, should be arranged to completely disclose the invention.

The controls shown in the left portions of Figs. 1 and 2 are similar to the controls which would be found in an actual airplane but have been modified by the addition of cam-operated contacts and potentiometers in order that their operations which normally would control valves of the hydraulic system, may be simulated electrically.

Each of the motor units of Fig. 4 comprises a motor of the alternating current shaded pole type having a main field winding energized from a source of alternating current and two shaded pole windings one of which when short-circuited will cause the rotor of the motor to be turned in one direction of rotation and the other of which when short-circuited will cause the rotor of the motor to be turned in the opposite direction of rotation. The rotor turns a shaft having switch operating cams thereon and through gearing may operate the sliders of one or more potentiometers.

The indicated air speed, altimeter and R. P. M. motor units of Fig. 2 are of the type disclosed in the application of Albert, Davis, Gumley and Holden, Serial No. 502,484, filed September 15, 1943. This application has since matured into Patent No. 2,428,767, dated October 14, 1947. These motor units would be controlled to position their shafts into positions representative of the indicated air speed, altitude and engine speed in response to the operation of the flight and engine controls of the trainer in the general manner disclosed in the application of R. C. Davis, E. J. Fogarty and R. O. Rippere, Serial No. 542,986, filed June 30, 1944.

To prepare the trainer for simulating the operation of an airplane the master ignition switch 200, sometimes called the "crash bar," must be in the closed position thereby establishing an obvious circuit for the MB relay 201, and the circuit breaker switches 202 and 203 should be closed thereby causing the operation of the RB and LB relays 204 and 205 representative of the application of power from the storage battery to the right and left portions of the airplane. In an actual airplane the master ignition switch when operated enables the ignition circuits of the engines and connects the battery bus bar, from which battery power is supplied to the airplane, to the storage battery. If a crash seems imminent this switch may be operated to the "off" position in which the engine magnetos all become grounded thereby stopping the engines and the battery circuit is opened leaving no electric current on the airplane.

In the trainer when the starting of the No. 3 engine is simulated the shaft 206 of the R. P. M. motor unit of Fig. 2 assumes a position representative of the speed of rotation of such engine and the cam 207 moves from its normal position to permit the closure of the contacts of the L1 limit switch thereby closing the circuit of the ON relay 208. This relay, upon operating, in addition to establishing other circuits representative of the fact that the engine is started, closes a circuit extending from ground over contacts of such relay and over conductor 209 through the winding of the ENG relay 100 of Fig. 1 to battery. Relay 100 now operates representative of the operation of the hydraulic pump driven by the No. 3 engine of the actual airplane.

Relay 100, upon operating, establishes the circuit of the HP relay 101 over a circuit extending from ground, over the inner upper contacts of relay 100, over the lower contacts of the Main Hydraulic key 102 at the instructor's desk and through the winding of relay 101 to battery. Relay 101 operates to represent the creation of hydraulic pressure by the pump driven by the No. 3 engine. Relay 100 also establishes a circuit for the charge accumulator (CA) relay 300 since at this time there might be no simulated pressure in the accumulators of the hydraulic system. This circuit may be traced from ground over the upper contacts of relay 100, over conductor 103, over the contacts of the BP—L2 limit switch of the brake pressure motor unit of Fig. 4 and over conductor 400 through the winding of the CA relay 300 to battery.

Relay 300, which simulates the function of the unloader valve of an actual airplane, upon operating establishes over its upper contacts and conductor 401, a short circuit of the right shaded pole winding 402 of motor 403, and with the main stator winding 404 of the motor energized from the alternating current source 405, the motor will turn the shaft 406 at a slow speed in a counter-clockwise direction whereby through the gears 407 and 408 the slider of potentiometer BP10 is moved toward the No. 3 terminal of the potentiometer winding. The winding of this potentiometer is energized over a direct current path from battery through resistor 409, through the potentiometer winding and through resistor 410. Thus as the slider moves from the No. 1 terminal towards the No. 3 terminal of the potentiometer winding an increasing potential is derived at the potentiometer slider and applied over conductor 411, over the lower back contact of the accumulator empty (AE) relay 301, through resistor 302 to conductor 303 and thence in parallel to one control conductor of the inboard and outboard brake pressure indicators 304 and 305 at the instructor's desk and in parallel to one conductor of the corresponding indicators 104 and 105 on the pilot's instrument panel. These indicators are of the direct current "selsyn" type. Since the other two control conductors from these indicators are also connected in parallel over conductors 306 and 307 to taps on the potential divider 308, potentials of different value are also applied to such other control conductors and due to the changing potential applied from the slider of potentiometer BP10 the needles of the indicators will be moved to represent an increasing fluid pressure in the constant pressure portion of the simulated hydraulic system. The potential divider 308 comprises the resistors 309, 310 and 311 connected in series between battery and ground.

With the CA relay 300 operated, potential from the slider of potentiometer BP10 is also applied over the lower front contact of relay 300, through resistor 312 to conductor 313 and thence in parallel to one control conductor of the hydraulic pressure indicators 314 and 114 at the instructor's desk and on the pilot's instrument panel, respectively. The two other control conductors of these indicators are connected in parallel over conductors 315 and 316 to taps on the potential divider 317 whereby potentials of different values are applied to such control conductors. The potential divider 317 comprises the resistors 318, 319 and 320 connected in series between battery and ground. Thus as the slider of potentiometer BP10 moves, representative of an increase in fluid pressure, the needles of the indicators 314 and 114 will move to show the same increase in pressure as the indicators 304, 305, 104 and 105.

Violent movements of the needles of the hydraulic pressure indicators 314 and 114 are prevented by using the charging time of condenser 321 which charges over a circuit traced from the slider of potentiometer BP10 through resistor 312.

When the motor 403 has turned the slider of potentiometer BP10 to a position representative of a pressure of 1,125 pounds per square inch, the limit switch BP—L2 will be operated to the open contact position thereby opening the previously traced circuit of the CA relay 300 which will thereupon release to open the short circuit of the shaded pole winding 402 of motor 403 whereupon the motor will come to rest. The release of relay 300 also removes the potential applied from the slider of potentiometer BP10 to the hydraulic indicators 314 and 114 whereupon such indicators will show a decrease in pressure to 50 pounds per square inch as determined by potential applied thereto through resistor 312, over the back contact of relay 300 from a tap on the potential divider comprising resistors 322 and 106 connected in a series circuit from battery through resistor 106, over the upper contacts of the operated HP relay 101, over conductor 107, over the normally closed front contact of the slow-to-release relay 323 and through resistor 322 to ground. This reduction in pressure indication is representative of the pressure in the open-center portion of the hydraulic system of an airplane after the accumulators have become charged and the unloader valve has operated. The brake pressure indicators continue to read the accumulator pressures of 1,125 pounds per square inch.

The instructor can simulate the failure of the open-center portion of the hydraulic system by operating the Main Hydraulic key 102 to its open position thereby opening the circuit of the HP relay 101. The potential divider circuit controlled by relay 101 will now be opened and the hydraulic pressure indicators 314 and 114 which indicate the pressure in the open-center portion of the system will now show a decrease in pressure to zero. With relay 101 thus deenergized to represent the failure of pressure in the open-center system the wing flaps and landing gear motor units which simulate the hydraulic operation of the wing flaps and landing gear cannot be operated from the simulated open-center system as will be hereinafter described. The operation of switch 102 does not prevent the simulation of the emergency lowering of the wing flaps by direct hand pump operation and does not disable the brake pressure system.

The pilot may supplement the pressure derived from the engine driven pump by starting an auxiliary electric motor driven pump through the operation of the Hydro Booster circuit breaker switch 108 located on the pilot's pedestal. In the trainer the operation of the electric pump is simulated by the operation of the electric pump (EP) relay 109, the circuit of which is established by the operation of the electric pump circuit breaker (EPCB) relay 110 when the circuit breaker switch 108 is closed, if the master battery (MB) relay 201 and either the left or right battery (LB or RB) relays 204 and 205 or both have been operated as previously described. With relays 201, 204 and 205 and 110 all operated the circuit of relay 109 may be traced from ground over contacts of either or both relays 204 and 205, over the back contact of battery cut-off (BCO) relay 210, over the contacts of relay 201, conductor 211, over the upper front contacts of relay 110 and through the winding of relay 109 to battery.

If the engine is running and the ENG relay 100 is operated, the operation of the EP relay 109 establishes a supplementary ground to conductor 103, over its upper contacts and over the lower normal contacts of the Electric Pump disabling key 111 at the instructor's desk whereby the circuit of the CA relay 300 is maintained after the simulated disabling of the engine driven pump is represented by the disabling of the engine. If the engine driven pump of the airplane fails and the electric pump is started, a cross-over valve may be operated to permit the electric pump to produce pressure for normal operation of landing gear, wing flaps, and bomb doors. In the trainer the function of the cross-over valve is simulated by the operation of the Emergency Shut-off Valve key 112 at the instructor's desk. With the engine assumed to be disabled, as simulated by the release of ENG relay 100, the previously traced circuit for the HP relay 101 is opened but with the EP relay 109 operated and key 112 also operated, relay 101 is maintained operated in a circuit from ground over the upper contacts of key 111, contacts of key 112, the inner upper contacts of relay 109, the lower contacts of key 102 and through the winding of relay 101 to battery. Under this condition with relays 109 and 101 both operated, the maintenance of pressure in both the open-center and constant pressure portions of the hydraulic system is maintained. The pilot will request the instructor to operate the key 112 when he desires such key to be operated as he would instruct a member of the airplane crew to operate the cross-over valve.

Under these conditions if the instructor operates the Main Hydraulic Line key 102 to its open or disable position, the disabling of the open-center portion of the hydraulic system is simulated and if the Electric Pump disable key 111 is operated to its open or disable position the circuits for both the HP and CA relays 101 and 300 are opened and the disabling of the entire hydraulic system is thus simulated. The hydraulic pressure indicators will then operate to show a reduction of pressure in the open-center portion of the system to zero but the brake pressure indicators will still indicate the accumulator pressures previously established by the operation of the brake pressure motor unit. The simulation of the disabling of the electric pump may be accomplished by the instructor by the operation of the Hydro Booster circuit breaker switch 113 whereby direct battery is connected between the circuit breaker switch 108 at the pilot's pedestal and the winding of relay 110 to cause the circuit breaker switch to open and to cause relay 110 to release and in turn to release the EP relay 109. Relay 110 upon releasing opens the circuit of Hydro Booster Emergency lamp 115 at the instructor's desk, which lamp lighted when the pilot operated switch 108, to inform the instructor that the pilot had resorted to the use of the electric pump. Relay 110 also establishes the circuit of the Hydro Booster lamp 116 which lights and remains lighted until the pilot restores the circuit breaker switch 108.

In the event both the engine driven pump and the electric motor driven pump fail the copilot may supply hydraulic pressure in an actual airplane by the operation of the emergency hand pump located at the right of his seat. In the trainer the hand pump is provided with a switch 212 which is operated by the forward and backward movement of the pump handle 213, as disclosed in Fig. 2, to alternately close the circuit extending over conductors 214 and 215 through the windings of the pump handle up (PU) and pump handle down (PD) relays 117 and 118, respectively. These relays operate in alternation and being slow to release both will be operated during the interval required for one of them to release. During the time both are operated a circuit is established over their lower contacts through the Hand Pump lamp 119 at the instructor's desk to inform the instructor that the hand pump is being used.

At this time the Forward Emergency Flap Lowering Valve 216 is open and the Aft Emergency Flap Lowering Valve 217 is closed and consequently the circuits controlled by the switches associated therewith extending to the windings of the forward valve (FV) relay 120 and to the winding of the aft valve (AV) relay 121 will be opened. Thus during each interval that the relays 117 and 118 are both operated a circuit will be established for the HP relay 101 which may be traced from ground over the upper front contacts of relays 118 and 117, over the upper back contact of the FV relay 120, over the lower contacts of key 102 and through the winding of the HP relay 101 to battery. With relay 101 thus operated it will be possible, as later described, to simulate the operation of the landing gear or of the wing flaps. A circuit is also established from ground over the inner upper contacts of relays 118 and 117 and over the inner upper back contact of the FV relay 120 to conductor 103 and thence as traced through the winding of the CA relay 300 to battery whereby such latter relay may be operated to control the brake pressure motor unit in simulation of the increase of pressure in the accumulators which would result from the operation of the hand pump. Since the circuits of the HP relay 101 and of the CA relay 300 are closed only intermittently when both relays 118 and 117 are operated, relays 101 and 300 will follow the hand pump operation and the brake pressure and hydraulic pressure indicators will consequently show fluctuating indications.

Should the instructor now operate the Main Hydraulic Line key 102 to its disable position the circuit of relay 101 will be opened thus simulating the disabling of the open-center portion of the system and the operation of the wing flaps or landing gear may not then be simulated.

*Landing gear operation*

In the actual airplane to prevent the retraction of the landing gear while the airplane is on the ground, an electromechanical lock is provided which prevents the pilot from moving the landing gear selector control to the "up" position until the airplane has left the ground. In the trainer the solenoid 122 is provided to prevent the valve stem 123 of the hydraulic valve 124 operable by the Landing Gear Selector lever 125 from moving to its "up" position. This solenoid can only be energized after an airborne condition of flight has been simulated by the release of the G4 relay 218, associated with the altimeter motor unit of the trainer. This relay released when the L1 and L3 switches of such unit moved to represent an airborne condition. Thereafter if the Landing Gear Safety (LS) relay 126 has been operated by the previous closure of the circuit breaker switch 127, the pilot may unlock the landing gear control lever by depressing the button 128 located in the top of the lever thereby establishing a circuit for locking solenoid 122 which may be traced from battery through the winding of solenoid 122, over the contacts of switch 128, over the contacts of relay 126, conductor 129 and to ground at the back contact of relay 218. The altimeter motor unit functions in the manner described in the application, Serial No. 542,986, hereinbefore referred to.

With the lock now removed by the operation of solenoid 122 the pilot may now move lever 125 to the right or "up" position. With the valve stem operated to its "up" position the contacts 131 are closed thereby establishing a circuit from ground thereover, over conductor 132 and through the winding of the leading gear "up" (GU) relay 324. This relay upon operating establishes over its upper contacts and conductor 325, a circuit for the Landing Gear Selector Up lamp 133 at the instructor's desk to inform the instructor that the pilot has operated the landing gear selector to its "up" position. At its inner upper contacts relay 324 establishes a locking circuit for the HP1 relay 134, which operated following the operation of the HP relay 101 over an obvious circuit. The locking circuit for relay 134 may be traced from battery through the winding and upper contacts of relay 134, over the upper contacts of key 102 at the instructor's desk, over conductor 135 and to ground over the inner upper contacts of relay 324. This locking circuit prevents the release of relay 134 during the time that the landing gear selector is in the "up" position except through the operation of the disable key 102 by the instructor. Relay 324 also establishes a circuit from ground over its lower middle contact, over conductor 326, over the upper back contact of the L1 relay 412, over conductor 413 and through the winding of the DGU relay 327 to battery.

Relay 327 upon operating establishes a circuit from ground over its upper contacts and conductor 328 and through the winding of solenoid 136 to battery, which operates to position the locking detent 130 of the hydraulic valve 124 to lock the valve stem 123 in its operated "up" position. Relay 327 also establishes a circuit from battery through resistor 137, over the lower contacts of the HPI relay 134 over conductor 138, over the back contact of the KGU relay 329, over the inner upper contacts of relay 327, through resistor 330, over the front contacts of the RV2 relay 323 and through resistor 322 to ground. Potential derived from this potential divider is applied over the lower back contact of the CA relay 300 and through resistor 312 to the hydraulic pressure indicators 114 and 314 whereupon such indicators are operated to show a pressure of 800 pounds per square inch representative of the pressure which would be applied from the open-center system of an airplane to the landing gear operating cylinders.

Relay 327 also establishes a circuit from ground over the inner lower front contact of the HP relay 101, over the upper back contacts of the FD relay 139 and the FU relay 140, over conductor 141, over the lower contacts of relay 327, over conductor 364 and through the right shaded pole winding 414 of the motor 415 of the landing gear motor unit of Fig. 4 to ground. Since the stator winding 416 of this motor is energized from the alternating current source 405, the motor now turns the shaft 417 and through the gears 418 and 419 turns the slider of potentiometer LG7 from the No. 3 terminal toward the No. 1 terminal of the potentiometer winding representative of the retraction of the landing gear.

When the cam 442 closes the contact of limit switch LG—L1 as the slider approaches the No. 1 terminal of the potentiometer winding, an obvious circuit is established for the L1 relay 412. Relay 412 upon operating also connects ground over its lower contacts to control conductors 420 and 421 extending through cable 422 to the Landing Wheel Flaps Indicators 342 and 142 on the instructor's and pilot's instrument panels to cause such indicators to indicate the movement of the landing gear to the "up" position. At its upper contact relay 412 opens the previously traced circuit for the DGU relay 327 and closes the circuit of the KGU relay 329. Relay 327 upon releasing opens the short circuit of the right shaded pole winding 414 of the motor 415 thereby stopping the motor.

Relay 327 is slow to release and therefore does not open the potential divider circuit previously traced through resistors 137, 330 and 322 until after relay 329 has operated to establish the potential divider circuit extending as previously traced from battery through resistor 137 to conductor 138 and thence over the upper front contact of relay 329, through resistor 331, over the front contacts of the RV2 relay 323 and thence through resistor 322 to ground. The potential now derived from this potential divider and applied over the lower back contact of the CA relay 300 is increased so that the readings of the hydraulic pressure indicators 314 and 114 will now increase to 1,040 pounds per square inch representative of the building up of the pressure in the landing gear control valve of an actual airplane after the pistons of the landing gear cylinders have moved to the limit of their movements in the retracting direction and before the kick-out detent of the valve operates to permit the restoration of the valve stem and control lever to their neutral positions. Relay 329 upon operating also establishes a circuit from ground over its lower contacts and through the winding of the RV (relief valve) relay 332 to battery and such relay operates.

In the trainer the pressure operated kick-out detent of the control valve is simulated by the detent 130 controlled by the solenoid 136 the circuit of which is opened upon the release of relay 327. When the solenoid releases, the valve stem 123 is released and through the action of the spring 143, roller 144 and cam 145 the control lever 125 is returned to its neutral position thereby opening the contacts 131 to release the GU relay 324 followed by the release of the KGU relay 329 and the RV relay 332. A potential divider circuit is now established from battery through resistor 106, over the upper contacts of relay 101, over conductor 107, over the front contact of relay 323 and through resistor 322 to ground whereby the potential now derived from such potential divider and applied over the lower back contact of relay 300 to the indicators 314 and 114 causes the readings of such indicators to decrease to a value of 50 pounds per square inch as would result from the restoration of the control valve to its neutral position and the reestablishment of the open-center portion of the hydraulic system from the engine driven pump to the fluid reservoir.

If for any reason the valve stem does not restore to normal, the hydraulic pressure continues to increase until the relief valve operates (1,250 pounds per square inch). This is simulated as follows: Relay 329 upon operating also established the circuit previously traced through the winding of the RV (relief valve) relay 332 to battery which relay, upon operating, opens the circuit of the RV1 relay 333. Relay 333, which is also slow to release, releases after an interval and opens the circuit of the RV2 relay 323 which is slow to release. After an interval (during which the valve stem would normally return to its neutral position) relay 323 opens at its front contact the circuit over which the potential divider including resistors 137, 331 and 322 was established and closes a circuit through resistors 137 and 322. Thus the potential which established the kick-out pressure readings of 1,040 pounds per square inch on the hydraulic pressure indicators is changed to a value which causes an indication of a pressure of 1,250 pounds per square inch.

The retraction of the landing gear when the electric motor driven pump is being used is simulated in the manner just described, the HP and HPI relays 101 and 134 being operated under the control of the EP relay 109 rather than under the control of the ENG relay 100.

To simulate the retraction of the landing gear by hand pump operation the landing gear selector lever 125 must be in the "up" position, the Main Hydraulic key 102 at the instructor's desk must be in the closed position, the forward valve 216 must be closed and the aft valve 217 must be opened. Under this condition the FV and AV relays 120 and 121 are unoperated. When the hand pump handle 213 is now operated relays 117 and 118 are alternately operated resulting in the intermediate operation and release of the HP relay 101 in the manner previously described. Relay 101 upon operating causes the operation of the HPI relay 134 which locks, as previously described, under the control of the GU relay 324 which operated in response to the operation of the selector lever 125 into its "up" position. With relay 324 operated the DGU relay 327 operates and the pressure readings of the hydraulic indicators 114 and 314 increase to 800 pounds per square inch as previously described. With relay 327 now operated the previously traced circuit for short-circuiting the right shaded pole winding 414 of the motor 415 of the landing gear motor unit is reestablished from ground over the inner lower front contact of the HP relay 101. Since, however, relay 101 operates and releases in response to the strokes of the hand pump handle the motor 415 will operate intermittently in a direction representative of the landing gear retraction. After the operation of the LG—L1 limit switch the circuits function as described for the regular or auxiliary hydraulic system operation except that the HP and HP1 relays 101 and 134 release after the landing gear has been retracted and the hand pump operation ceases. Relay 101 upon releasing will open the potential divider circuit from which potential is applied to the hydraulic pressure indicators 114 and 314 so that such indicators will now show zero pressure in the open-center portion of the hydraulic system.

*Landing gear operation—Lowering*

Before lowering the landing gear the kick-out pressure in an actual airplane should be checked by moving the landing gear selector lever into its "up" position. In the trainer, with the lever 125 in its "up" position the GU relay 324 will operate as previously described and if the simulated landing gear is in its fully retracted position the L1 relay 412 will be operated and consequently following the operation of relay 324 the KGU relay will operate and in the manner previously described the potential divider circuit including resistors 137, 331 and 322 will be established whereby the potential derived therefrom and applied to the hydraulic pressure indicators 114 and 314 will cause their readings to increase to the kick-out pressure of 1,040 pounds per square inch until the RV2 relay 323 is released in the manner previously described. When relay 323 releases a new potential divider circuit is established from battery through resistor 137 over the lower contacts of the HP1 relay 134, conductor 138, the back contact of the RV2 relay 323 and through resistor 322 to ground and the potential derived from such potential divider and applied to the hydraulic pressure indicators 114 and 314 will cause such indicators to show an increase in pressure to 1,250 pounds per square inch.

To lower the landing gear while in flight, the landing gear control lever 125 is moved to the "down" position thereby closing the cam operated contacts 146 and establishing a circuit from ground thereover, over conductor 147 and through the winding of the GD relay 334 to battery. Relay 334 upon operating establishes a circuit from ground over its middle upper contacts and conductor 335 for the Landing Gear Selector Down lamp 148 to inform the instructor that the pilot has operated the landing gear selector lever 125 into its "down" position, and establishes the circuit of the DGD relay 336 which may be traced from ground over the middle lower contacts of relay 334, over the lower back contact of the L2 relay 337 and through the winding of the DGD relay 336 to battery. If the hydraulic system has not been disabled, a potential divider circuit will now be established from battery, through resistor 137 over the lower contacts of the HP1 relay 134, over conductor 138, over the upper back contacts of the GDF and KGD relays 338 and 339, over the inner upper contacts of the DGD relay 336, through resistor 340, over the front contacts of the RV2 relay 323 and through resistor 322 to ground, from which potential divider a potential is derived and applied to the hydraulic pressure indicators 114 and 314, causing them to show a hydraulic pressure of 400 pounds per square inch which is the operating pressure required to lower the landing gear.

Relay 336 upon operating establishes an obvious circuit for the DGD1 relay 341 which operates and establishes a shunt for the left shaded pole winding 423 of the motor 415 of the landing gear motor unit. This shunt circuit may be traced from ground over the inner lower contacts of the HP relay 101, over the upper back contacts of the FD and FU relays 139 and 140, over conductor 141, over the inner upper back contact of the GDF relay 338, over the upper contacts of the DGD1 relay 341, over conductor 343 and through the left shaded pole winding 423 of the motor 415. The motor now operates in a direction representative of the lowering of the landing gear. Relay 336 also closes the circuit of the MGD relay 344 which extends from ground over the contacts of the LG—L3 limit switch of the landing gear motor unit, over conductor 429, over the lower contacts of relay 336 and through the winding of relay 344 to battery, and relay 344 operates.

When the cam 424 closes the contacts of limit switch LG—L2 as the slider of potentiometer LG7 approaches the No. 3 terminals of the potentiometer winding, a circuit is established from ground thereover, over conductor 425 and through the winding of the L2 relay 337 to battery. Relay 337 upon operating connects ground over its upper contacts to control conductors 426 and 427. Thus with conductors 426 and 427 extending through cable 422 connected to ground, the Landing Wheel Flap Indicators 342 and 142 are controlled to indicate the movement of the landing gear toward its "down" position. When the shaft 417 of the landing gear motor unit reaches a position representative of the start of the main landing gear in its lowering movement, cam 428 opens the circuit of the MGD relay 344 which now releases and connects ground over its lower contacts and the lower contacts of the DGD1 relay 341 to control conductor 420 extending through cable 422 to the indicators 342 and 142 which now operate to further indicate that the main landing gear has started to lower.

Relay 337 at its lower contacts opens the previously traced circuit for the DGD relay 336 and closes the circuit for the KGD relay 339. Relay 336 upon releasing releases relay 341 and opens the shunt circuit of the left shaded pole winding 423 of the motor 415 whereupon the motor comes to rest.

Relay 336 is slow to release and therefore does not open the potential divider circuit previously traced through resistors 137, 340 and 322 until after relay 339 has operated to establish the potential divider circuit extending from battery through resistor 137 to conductor 138 and thence over the upper back contact of the GDF relay 338, the upper front contact of relay 339, through resistor 345, over the front contact of RV2 relay 323 and thence through resistor 322 to ground. The potential now derived from this potential divider and applied to the hydraulic pressure indicators 314 and 114 will cause such indicators to show readings of 850 pounds per square inch representative of the building up of the pressure in the landing gear control valve of an actual airplane after the pistons of the landing gear cylinders have moved to the limit of their movement in the lowering direction and before the kick-out detent of the valve operates to permit the restoration of the valve stem and control lever to their neutral positions.

As previously stated, the pressure operated kick-out detent of the control valve is simulated in the trainer by the detent 130 controlled by the solenoid 136, the circuit of which extends over conductor 328 and to ground over the upper contacts of the DGD relay 336. This circuit is opened upon the release of relay 336. When the control valve stem restores to its neutral position under the control of spring 143, roller 144 and cam 145, the switch 146 is opened thereby releasing the GD relay 334, followed by the release of the KGD relay 339 and the RV relay 332. A potential divider circuit previously traced through resistors 106 and 322 is again established whereby the potential derived therefrom and applied to the hydraulic pressure indicators 314 and 114 causes the readings of such indicators to decrease to a value of 50 pounds per square inch.

The lowering of the landing gear when the electric motor driven pump is being used is simulated in the manner just described, the HP and HPI relays 101 and 134 being operated under the control of the EP relay 109 rather than under the control of the ENG relay 100.

To simulate the lowering of the landing gear by hand pump operation, the landing gear selector must be in the "down" position, the Main Hydraulic key 102 at the instructor's desk must be in the closed position, the forward valve 216 must be closed and the aft valve 217 must be opened. Under this condition the FV and AV relays 120 and 121 are both unoperated. When the hand pump handle 213 is now operated, relays 117 and 118 are alternately operated resulting in the intermittent operation and release of the HP relay 101 in the manner previously described. Relay 101 upon operating causes the operation of the HPI relay 134 which locks as previously described under the control of the GD relay 334, which operated in response to the operation of the selector valve lever 125 into its "down" position. With relays 101 and 134 operated, the GD relay 336 operates and pressure readings of the hydraulic indicators 114 and 314 increase to 400 pounds per square inch. With relay 336 now operated, the previously traced circuit for short-circuiting the left shaded pole winding 423 of motor 415 of the landing gear motor unit is established from ground over the inner lower front contact of the HP relay 101. Since relay 101 operates and releases in response to the strokes of the hand pump handle, the motor 415 will operate intermittently in a direction representing the landing gear lowering. After the operation of the LG—L2 limit switch, the circuits function as described for the regular or auxiliary hydraulic system operation except that the HP and HPI relays 101 and 134 release after the landing gear has been lowered and the hand pump operation ceases, and relay 101 upon releasing will open the potential divider circuit from which potential is applied to the hydraulic pressure indicators 114 and 314 so that such indicators will show zero pressure readings of the pressure in the open-center portion of the hydraulic system.

The instructor may prevent the lowering of the landing gear by operating the Landing Gear key 149 thereby establishing a circuit from ground over its contacts, over conductor 150 and through the winding of the GDF relay 338 thus preventing the completion of the previously traced potential divider circuits from which potentials were derived for causing the hydraulic pressure indicators 114 and 314 to show a build-up of pressure above 50 pounds per square inch. Relay 338 also prevents the establishment of the previously traced circuit for causing the motor 415 to operate. Solenoid 136 remains operated under this condition to lock the landing gear selector lever 125 in its "down" position. Under this condition the pilot would have to use the emergency hand crank to lower the landing gear.

A mechanical system for lowering the main landing gear is installed in the airplane to be used in the event of failure of the normal or auxiliary hydraulic systems. This mechanism is controlled by a hand crank and drum mounted on the right wing spar at the center line of the airplane. In the trainer, this is simulated by the Emergency Landing Hand Crank key 346 at the instructor's desk. When the pilot has to resort to the hand crank he can simulate the lowering of the landing gear mechanically by asking the instructor to operate key 346 to its "down" position thereby establishing a circuit from ground thereover, over the upper front contact of the GDF relay 338, which will be operated, over the upper contacts of relay 341 and conductor 343 and through the left shaded pole winding 423 of motor 415 to ground. The motor 415 will now operate in a direction representative of the lowering of the landing gear until the limit switch LG—L2 causes the operation of the L2 relay 337 and the release of the DGD and DGDI relays 336 and 341 as previously described. The release of relay 341 opens the short circuit of the winding 423 of the motor 415 to stop the motor.

*Wing flaps operation—Lowering*

To simulate the lowering of the wing flaps the pilot moves the lever 151 of the wing flaps selector valve to the left thereby closing the contacts at 152 to establish the circuit of the FD relay 139. Relay 139 upon operating establishes over its inner lower contacts a circuit extending over conductor 153 for the Flaps Selector Down lamp 347 at the instructor's desk to inform the instructor that the pilot has operated the flaps selector to its "down" position. At its middle upper contacts relay 139 establishes the circuit of the DFD relay 348 if the air speed of the simulated flight is less than 135 knots and the HAS relay 349 has not operated. This circuit may be traced from ground over the middle upper contacts of relay 139, over conductor 154, over the middle lower bank contact of relay 349, over conductor 350, over the normal contacts of the F—L2 limit switch of the flaps motor unit of Fig. 4, over conductor 351 and through the winding of relay 348 to battery. At its middle lower contacts relay 139 establishes a locking circuit for the HPI relay 134 which may be traced from battery through the winding and upper contacts of relay 134, over the upper contacts of key 102 at the instructor's desk and over the contacts of relay 139 to ground to prevent the release of relay 134 during the time that the wing flaps selector is in the "down" position except through the operation of the disable key 102 by the instructor.

Relay 348 upon operating establishes a circuit from ground over its upper contacts, over conductor 352 and through the winding of solenoid 155 which operates to position the locking detent 156 of the hydraulic valve 157 to lock the valve stem 158 in the operated "down" position. Relay 348 also establishes a circuit from battery through resistor 137, over the lower contacts of the HPI relay 134, over conductor 138, over the upper back contact of the FDF relay 353, over the upper back contact of the KFD relay 354, over the inner upper contacts of relay 348, through resistor 355, over the front contact of the RV2 relay 323 and through resistor 322 to ground. Potential derived from this potential divider is applied to the hydraulic pressure indicators 114 and 314 whereupon such indicators are operated to show pressure readings of 300 pounds per square inch representative of the pressure which would be applied from the open center system of an actual airplane to the wing flaps operating cylinders to lower the wing flaps.

Relay 348 also establishes a circuit from ground over the inner lower front contacts of the HP relay 101, over conductor 165, over the lower back contacts of relays 334, 324 and 349, over the inner upper back contact of relay 353, over conductor 356, over the lower back contact of the FU relay 140, over conductor 159, over the lower contacts of relay 348, conductor 357, and through the right shaded pole winding 430 of motor 431 of the flaps motor unit to ground. Since the stator winding 432 of this motor is energized from the alternating current source 405, the motor now turns the shaft 433 and through the gears 434 and 435 turns the sliders of the telemetric transmitters FT and FT' in a direction representative of the lowering of the wing flaps. These transmitters control the Landing Wheel Flap Indicators 142 and 143 on the pilot's and instructor's instrument panels in the well-known manner to indicate the lowering of the wing flaps.

When the cam 436 operates the contacts of limit switch F—L2 to their alternate position as the shaft 433 approaches a position representative of the lowered positions of the wing flaps, a circuit is established from ground applied as previously described to conductor 350, thence over the alternate contacts of the F—L2 limit switch over conductor 437, and through the winding of the KFD relay 354 to battery. At the same time the previously traced circuit for the DFD relay 348 is opened and relay 348, upon releasing, opens the shunt of the right shaded pole winding 430 of the motor 431 thereby stopping the motor.

Relay 348 is slow to release and therefore does not open the potential divider circuit previously traced through resistors 137, 355 and 322 until after relay 354 has operated to establish the potential divider circuit extending as previously described from battery through resistor 137 to conductor 138 and thence over the upper back contact of relay 353, over the upper front contact of relay 354, through resistor 358, over the front contact of the RV2 relay 323 and thence through resistor 322 to ground. The potential now derived from this potential divider and applied to the hydraulic pressure indicators 314 and 114 is increased so that the readings of the indicators will increase to 460 pounds per square inch representative of the building up of the pressure in the wing flaps control valve of an actual airplane after the pistons of the wing flaps cylinders have moved to the limit of their travel in the lowering direction and before the kick-out detent of the valve operates to permit the restoration of the valve stem and control lever to their neutral positions.

The pressure operated kick-out detent of the control valve is simulated in the trainer by the detent 156 controlled by the solenoid 155, the circuit of which is opened when the DFD relay 348 releases as previously described. When the control valve stem restores to its neutral position under the control of spring 160, roller 161 and cam 162, the switch 152 is opened thereby releasing the FD relay 139 followed by the release of the KFD relay 354 and the RV relay 332. A potential divider circuit previously traced through resistors 166 and 322 is again established whereby the potential derived therefrom and applied to the hydraulic pressure indicators 314 and 114 causes the readings of such indicators to decrease to a value of 50 pounds per square inch.

The lowering of the wing flaps when the electric motor driven pump is being used is simulated in the manner just described, the HP and HPI relays 101 and 134 being operated under the control of the EP relay 109 rather than under the control of the ENG relay 100.

To simulate the lowering of the wing flaps by hand pump operation, the wing flaps selective valve must be in the "down" position, the Main Hydraulic key 102 at the instructor's desk must be in the closed position, the forward valve 216 must be open and the aft valve 217 must be closed. Under this condition relays 120 and 121 will both be unoperated. When the hand pump handle is now operated, relays 117 and 118 are alternately operated resulting in the intermittent operation and release of the HP relay 101 in the manner previously described. Relay 101 upon operating causes the operation of the HPI relay 134 which locks as previously described under the control of the FD relay 139, which operated in response to the operation of the selector valve stem 158 into its "down" position. With relays 101 and 134 operated the DFD relay 348 operates and pressure readings of the hydraulic indicators 114 and 314 are increased to 300 pounds per square inch as previously described. With relay 348 now operated the previously traced circuit for short-circuiting the right shaded pole winding 430 of motor 431 of the wing flaps motor unit is established from ground over the inner lower contacts of relay 101. Since relay 101 operates and releases in response to the strokes of the hand pump handle, the motor 431 will operate intermittently in a direction representative of the lowering of the wing flaps. After the operation of the F—L2 limit switch, the circuits function as previously described for the regular or auxiliary system operation except that the HP and HPI relays 101 and 134 release after the wing flaps have been lowered and the hand pump operation ceases and relay 101 upon releasing will open the potential divider circuit from which potential is applied to the hydraulic pressure indicators 114 and 314 so that such indicators will now show zero readings of pressure in the open-center portion of the hydraulic system.

If both the regular and auxiliary hydraulic systems of the airplane have become disabled, the pilot may lower the wing flaps by direct hand pump operation by operating the wing flaps selector lever into its "down" position, by closing the forward emergency flap lowering valve and by opening the aft emergency flap lowering valve. In the trainer these operations are simulated by the similar operation of the wing flaps selector lever 151 and the forward and aft valves 216 and 217. Under these conditions the FD relay 139, the DFD relay 348 and the FV and AV relays 120 and 121 will be operated. Relays 120 and 121 upon operating close obvious circuits for the forward and aft lamps 163 and 164 at the instructor's desk to inform the instructor that the valves have been operated to positions to allow the direct operation of the wing flaps by hand pump operation.

With relays 120, 121 and 348 operated, upon the alternate operation of the relays 117 and 118 in response to the operation of the hand pump, a circuit is established over the upper contacts of relays 117 and 118, over the upper front contacts of relay 120, the lower contacts of relay 121, conductor 159, lower contacts of relay 348, over conductor 357 and through the right shaded pole winding 430 of motor 431 of the flaps motor unit to ground. The result is an intermittent operation of the motor in a direction representative of the lowering of the wing flaps. When the shaft 433 has rotated to a position representative of the lowered position of the wing flaps, cam 436 operates the contacts of limit switch FL—2 to open the circuit of relay 348 which releases and stops the motor 431. When relay 348 releases, the circuit of the solenoid 155 is opened and the lever 151 of the flaps selector returns to its neutral position. Since direct hand pump operation of the wing flaps does not build up pressure in the open-center portion of the hydraulic system of an airplane, the hydraulic pressure indicators remain at zero pressure. In the trainer this is simulated since with the HP and HPI relays 101 and 134 unoperated, no potential divider circuits are established as previously described from which potential for operating the indicators may be derived.

The simulation of the disabling of the wing flaps may be simulated without simulating the disabling of the main hydraulic line by the operation of the Flaps Selector key 359 at the instructor's desk, thereby causing the operation of the FDF relay 353 over an obvious circuit. With relay 353 operated, the potential divider circuits previously traced from which potentials were derived to cause the hydraulic pressure indicators 114 and 314 to show the operating and kick-out pressures of 300 and 460 pounds per square inch cannot be established and the normal path by which the motor 431 of the flaps motor unit was controlled by relay 348 is opened at the inner upper back contacts of relay 353. At its lower contacts relay 353 supplies ground from the lower contacts of relay 139, over conductor 166, over the lower contacts of relay 353 and conductor 352, through the solenoid 155 to prevent the release of such solenoid and the removal of the detent 156 of the valve 157. The lever 151 thus remains locked in its down position. With this type of failure the flaps can be lowered by direct hand pump operation as previously described.

*Wing flaps operation—Raising*

To simulate the raising of the wing flaps, the pilot moves the lever 151 of the wing flaps selector valve to the right, thereby closing the contact set 167 to establish the circuit of the FU relay 140. Relay 140, upon operating, establishes over its inner lower contacts the circuit extending over conductor 168 for the Flaps Selector Up lamp 367 at the instructor's desk to inform the instructor that the pilot has operated the flaps selector to its up position. At its upper contacts, relay 140 establishes a circuit from ground over conductor 169, over the normal contacts of limit switch F—L1 of the flaps motor unit, over conductor 438 and through the winding of the DFU relay 360 to battery. At its lower contacts, relay 140 establishes a locking circuit for the HPI relay 134 which may be traced from battery through the winding and upper contacts of relay 134, over the upper contacts of key 102 at the instructor's desk and over the contacts of relay 140 to ground to prevent the release of relay 134 during the time that the wing flaps selector is in the "up" position, except through the operation of the disable key 102 by the instructor.

Relay 360, upon operating, establishes a circuit from ground over its upper contacts and conductor 352 through the winding of solenoid 155 which operates to position the locking detent 156 of the hydraulic valve 157 to lock the valve stem 158 in its operated "up" position. Relay 360 also establishes a circuit from battery through resistor 137 over the lower contacts of the HPI relay 134, over conductor 138, over the upper back contact of the HAS relay 349, over the upper back contact of the KFU relay 361, over the upper inner contacts of relay 360, through resistor 362, over the front contact of the RV2 relay 323, and through resistor 322 to ground. Potential derived from this potential divider is applied to the hydraulic pressure indicators 114 and 314 whereupon such indicators are operated to show pressure readings of 550 pounds per square inch representative of the pressure which would be applied from the open-center system of an airplane to the wing flaps operating cylinders to raise the wing flaps.

Relay 360 also establishes a circuit from ground over the inner lower front contact of the HP relay 101, over conductor 165, over the lower back contacts of relays 334, 324 and 349, over the lower contacts of relay 360 and over conductor 363 through the left shaded pole winding 439 of motor 431 of the flaps motor unit to ground. Since the stator winding 432 of this motor is energized from the alternating current source 405, the motor now turns the shaft 433 in a direction representative of the raising of the wing flaps and the telemetric transmitters FT and FT' accordingly control the indicators 142 and 342 respectively.

When the cam 440 operates the contacts of limit switch F—L1 to their alternate position, as the shaft 433 approaches a position representative of the raised positions of the wing flaps, a circuit is established from ground applied as previously described to conductor 169, thence over the alternate contacts of switch F—L1, over conductor 441, over the inner upper back contact of the HAS relay 349 and to battery through the winding of the KFU relay 361. At the same time, the previously traced circuit for the DFU relay 360 is opened and relay 360 upon releasing opens the shunt of the left shaded pole winding 439 of motor 431 thereby stopping the motor.

Relay 360 is slow to release and therefore does not open the potential divider circuit previously traced through resistors 137, 362 and 322 until after relay 361 has operated to establish the potential divider circuit extending as previously traced from battery through resistor 137 to conductor 138 and thence over the upper back contact of the HAS relay 349, over the upper front contact of relay 361, thence through resistor 365, over the front contacts of the RV2 relay 323 and through resistor 322 to ground. The potential now derived from this potential divider and applied over the lower back contact of relay 300, is increased so that the readings of the hydraulic pressure indicators 314 and 114 will increase to 750 pounds per square inch, representative of the building up of the pressure in the wing flaps control valve of an actual airplane after the pistons of the wing flaps operating cylinders move to the limit of their travel in the raising direction and before the kick-out detent of the valve operates to permit the restoration of the valve stem and control lever to their neutral positions.

The pressure operated kick-out detent of the control valve is simulated in the trainer by the detent 156 controlled by the solenoid 155 and is released when the DFU relay 360 releases as previously described. When the control valve stem 158 restores to its neutral position under the control of spring 160, roller 161 and cam 162, switch 167 is opened thereby releasing the FU relay 140 followed by the release of the KFU relay 361 and the RV relay 332. A potential divider circuit previously traced through resistors 106 and 322 is again established whereby the potential derived therefrom and applied to the hydraulic pressure indicators 314 and 114 causes the readings of such indicators to decrease to a value of 50 pounds per square inch.

Raising of the wing flaps when the electric motor driven pump is being used is simulated in the manner just described, the HP and HP1 relays 101 and 134 being operated under the control of the EP relay 109 rather than under the control of the ENG relay 100.

To simulate the raising of the wing flaps by hand pump operation, the wing flaps selector lever 151 must be in the "up" position, the Main Hydraulic key 102 at the instructor's desk must be in the closed position, the forward valve 216 must be open and the aft valve 217 must be closed. Under this condition relays 120 and 121 will both be unoperated. When the hand pump handle is now operated, relays 117 and 118 will operate alternately resulting in the intermittent operation and release of the HP relay 101 in the manner previously described. Relay 101 upon operating causes the operation of the HP1 relay 134 which locks as previously described under the control of the FU relay 140 which operated in response to the operation of the selector valve lever 151 into its "up" position. With relays 101 and 134 operated the DFU relay 360 operates and the pressure readings of the hydraulic indicators 114 and 314 are increased to 550 pounds per square inch as previously described. With relay 360 now operated, the previously traced circuit for controlling the motor 431 of the wing flaps motor unit is established from ground at the inner lower contacts of relay 101. Since relay 101 operates and releases in response to the strokes of the hand pump handle the motor 431 will operate intermittently in a direction representative of the raising of the wing flaps. After the operation of the F—L1 limit switch, the circuits function as described for the regular or auxiliary system except that the HP and HP1 relays 101 and 134 release after the wing flaps have been raised and hand pump operation ceases and relay 101 upon releasing will open the potential divider from which potential is applied to the hydraulic pressure indicators 114 and 314 so that such indicators will show zero readings of pressure in the open-center portion of the hydraulic system.

If the air speed is in excess of 135 knots the wing flaps may not be lowered but if they are in the process of lowering, they are automatically raised. This is simulated in the trainer by the operation of the high air speed (HAS) relay 349 over a circuit established from ground over contacts of the L3 limit switch of the indicated air speed motor unit of Fig. 2, closed by the cam 219 when an air speed in excess of 135 knots is simulated, over conductor 220 and through the winding of relay 349 to battery. When relay 349 operates if the flaps are up, the circuit of the DFD relay 348 cannot be closed by the operation of the FD relay under the control of the flaps selector lever 151 because its circuit is opened at the middle lower back contact of relay 349 and consequently the simulation of the lowering of the wing flaps cannot be made. If the flaps are down, the operation of relay 349 will establish the circuit of the DFU relay 360 from ground over the inner lower contacts of relay 349, over conductor 169, over the normal contacts of the F—L1 limit switch of the wing flaps motor unit, over conductor 438 and through the winding of relay 360 to battery, or if the wing flaps are in the process of lowering, relay 349 will open the circuit of the DFU relay 348 at its middle lower back contact and will establish the circuit of relay 360 as just described. The release of relay 348 will stop the rotation of the motor 431 in the lowering direction and the operation of relay 360 will establish a circuit from ground over the lower contacts of relay 349, over the lower contacts of relay 360, conductor 363 and through the left shaded pole winding 439 of the motor 431 whereupon the motor will operate in a direction representative of raising the wing flaps until the cam 440 operates the limit switch FL—1 to open the previously traced circuit of relay 360 to stop the motor. Relay 349 also opens at its upper back contact the potential divider circuit which would ordinarily be established as previously described to cause the hydraulic pressure indicators 114 and 314 to show pressure readings. These operations simulate the movement of the wing flaps of an actual airplane to their raised positions due to the slip stream when the air speed is above 135 knots in which case no hydraulic pressure would be used and consequently no hydraulic pressure readings would be indicated by the pressure indicators.

In the actual airplane since the hydraulic valves which control the landing gear and the wing flaps mechanisms are positioned in tandem relationship in the open-center system, the operation of the wing flaps control valve prevents the application of the full hydraulic pressure to the landing gear operating cylinders. This prevents the simultaneous operation of both the wing flaps and the landing gear. This is simulated in the trainer by extending the circuits established over the lower contacts of the DFU and DFD relays 360 and 348 which control the motor 431 of the wing flaps motor unit, over the lower contacts of the GD and GU relays 334 and 324 so that if either of these relays is operated in response to the operation of the landing gear selector valve lever 125, the motor 431 cannot be operated to simulate the operation of the wing flaps. Also the circuit established over the lower contacts of the DGU relay 327 and the upper contacts of the DGD1 relay 341 which control the motor 415 of a landing gear motor unit, are extended over conductor 141 and over back contacts of the FU and FD relays 140 and 139 so that if either of these relays is operated in response to the operation of the wing flaps selector valve lever 151, the motor 415 cannot be operated to simulate the operation of the landing gear. Neither motor can therefore operate if the selector valves are simultaneously operated.

*Brake pedal operation*

The brakes of the actual airplane are operated by hydraulic pressure supplied from the accumulators of the constant pressure portion of the hydraulic system as previously described. Normally this pressure is kept at about 1100 pounds per square inch. In the trainer the operation of either brake pedal will cause the operation of the BK relay 170. It will be assumed that the right foot brake pedal is operated thereby rotating the shaft 221 to rotate cams 222 and 223 and through the gear sectors 224 and 225 and pinions 226 and 227 to rotate the sliders of potentiometers RB1 and RB2 toward the No. 3 terminals of the potentiometer windings. These potentiometers and the switch operated by cam 223 are provided to control the flight circuits of the trainer and do not perform any direct functions with respect to the present invention. The operation of the switch N of the right brake assembly to its alternate position establishes a circuit from ground over the normal contacts of the N switch associated with the left brake assembly, over the alternate contacts of the N switch associated with the right brake assembly, over conductor 228 and through the winding of the BK relay 170 to battery. Similiarly the operation of the left brake pedal would cause the operation of the N switch associated therewith to its alternate position thereby connecting ground to conductor 228 to complete the circuit of relay 170 or if both brakes are operated simultaneously, relay 170 will operate.

Relay 170 upon operating opens the normally closed circuit of the BPD relay 171 which releases and closes the circuit of the Foot Brake lamp 172 at the instructor's desk to inform the instructor that a foot brake is being operated. With relay 170 operated a circuit is closed during the releasing time of the slow-to-release relay 171 which may be traced from ground over the upper front contact of relay 170, over the lower contacts of relay 171, through resisistor 173, over conductor 174 and to the junction point between resistor 409 and the winding of potentiometer BP10 associated with the brake pressure motor unit, whereby the potential applied from the slider of the potentiometer over conductor 411, over the back contact of relay 301 to the brake pressure indicators 304, 305, 104 and 105 becomes reduced representative of the temporary drain of pressure from the accumulators of an airplane to operate the brakes. As soon as relay 171 is fully released, the circuit through resistor 173 is opened and the potential applied to the pressure indicators again rises representative of the restoration of pressure in the accumulators due to the continued operation of the engine driven or electric motor driven pump.

Should neither the engine driven pump or the electric motor driven pump be operating when the brakes are applied, this condition will be simulated in the trainer by the released condition of the ENG and EP relays 100 and 109. Under this condition each time that the brake pedal is depressed and then released, relay 170 will operate and release and being slow to release will establish a circuit from ground over the normal contacts of the N switches associated with the brake assemblies, over conductor 229, over the lower contacts of relay 170, over the lower back contacts of relays 109 and 100, over conductor 175, over the upper back contact of the AE relay 301, over conductor 443 and through the left shaded pole winding 444 of the motor 403 of the brake pressure motor unit. This circuit is closed only during the releasing time of relay 170 and causes the motor 403 to momentarily turn in a direction representative of a reduction in pressure in the accumulators. The motor 403 turns the slider of potentiometer BC10 a short distance toward the No. 3 terminal of the potentiometer winding thereby reducing the potential applied therefrom to the brake pressure indicators 304, 305, 104 and 105 whose readings are then decreased to show the drain of pressure incident to the operation of the brakes.

Continued operation and release of the brakes under this condition will result in a gradual bleeding of the pressure from the accumulators which is simulated by the gradual movement of the slider of potentiometer BP10 towards the No. 1 terminal of the potentiometer winding and the gradual decrease in the pressure readings of the brake pressure indicators to 600 pounds per square inch, at which time the slider will be at the No. 1 terminal of the potentiometer winding. When the slider has thus moved, the cam 445 closes the contacts of the BP—L1 limit switch thereby establishing a circuit from ground thereover and over conductor 446 through the winding of the accumulator empty (AE) relay 301 to battery.

Relay 301 upon operating opens the shunt circuit for the left shaded pole winding 444 of the motor 403 and at its lower front contact connects ground through resistor 366 and through resistor 302 to the brake pressure indicators 304, 305, 104 and 105 whereby the indicators are controlled to read zero representative of the complete zero pressure condition of the accumulators.

Brake pressure can, however, be maintained in the accumulators of the airplane by the operation of the hand pump. In the trainer, this is simulated by the intermittent closure of the circuit of the CA relay 300 by relays 117 and 118 under the control of the hand pump switch 212, which circuit extends from ground over the inner upper contacts of relays 118, 117 and 120, over conductor 103, over the contacts of the BP—L2 limit switch, which will be closed until a simulated accumulator pressure of 1100 pounds has been established, thence over conductor 400 and through the winding of relay 300 to battery. Relay 300 upon each energization will establish the previously traced shunt circuit for the right shaded pole winding 402 of motor 403 so that the motor will turn in a direction to advance the slider of potentiometer BP10 towards the No. 3 terminal of its winding, representative of the small increase in the pressure in the accumulators which would result from the hand pump operation. If the drain of pressure due to the operation of the brakes is less than the building up of pressure by the hand pump operation, the sum of the increments of movement of the motor 403 in the direction representative of increased accumulator pressure as controlled by the response of relay 309 to hand pump operation, will be greater than the sum of the increments of movement of the motor in the opposite direction under the control of the BK relay 170 and therefore the potential applied from the slider of potentiometer BP10 will cause the brake pressure indicators to show a gradual increase in pressure.

The operation of the parking brake at the pilot's pedestal closes the contacts of switch 176 to light the Park Brake lamp 177 at the instructor's desk but has no effect on the simulated hydraulic system since in the actual airplane the parking brake merely serves to lock the foot brake pedals in their operated positions if they have been operated.

What is claimed is:

1. In a ground trainer for aircraft flight personnel, means for simulating the operation of the engine driven pump of an airplane, a simulated hydraulic pressure indicator, a source of current, a relay operable in response to said engine driven pump simulating means for connecting said source of current to said indicator to cause said indicator to show a pressure reading representative of the operation of the engine driven pump, means for simulating the operation of a hydraulically operable device, a relay for controlling said latter means, a control operable by a pilot for operating said latter relay, and means controlled by said latter relay for varying the current applied to said indicator wherby said indicator is caused to show a change in hydraulic pressure comparable to the change in pressure incident to the operation of said device.

2. In a ground trainer for aircraft flight personnel, means for simulating the operation of the engine driven pump of an airplane, a simulated hydraulic pressure indicator, a source of current, a relay operable in response to said engine driven pump simulating means for applying a potential from said source to said indicator to cause said indicator to show a pressure reading representative of the application of pressure from the engine driven pump to the open-center hydraulic system of an airplane, means for simulating the operation of a hydraulically operable device, a relay for controlling said latter means, a control operable by a pilot for operating said latter relay, and means controlled by said latter relay for increasing the potential applied to said indicator from said source whereby said indicator is caused to show an increased reading representative of the increase of hydraulic pressure in the open-center system of an airplane incident to the operation of a control valve thereof.

3. In a ground trainer for aircraft flight personnel, means for simulating the operation of the hydraulic pressure pump of an airplane, a simulated hydraulic pressure indicator, a source of current, a relay operable in response to said pump simulating means for applying a potential from said source to said indicator to cause said indicator to show a pressure reading representative of the application of pressure from the pressure pump to the open-center hydraulic system of an airplane, means for simulating the operation of a hydraulically operable device, a relay for controlling said latter means, a control operable by the pilot for operating said latter relay, means for locking said control in its operated position representative of the operation of the hydraulically operated kick-out detent of the control valve of an airplane, means controlled by said latter relay for increasing the potential applied to said indicator from said source whereby said indicator is caused to show an increased reading representative of the increase of hydraulic pressure in the open-center system of an airplane incident to the operation of the control valve thereof, means operable upon the completion of the operation of the hydraulic device simulating means to further increase the potential applied from said source to said indicator representative of the building up of pressure in the control valve following the completion of the operation of the hydraulic device controlled thereby to force out the detent of the valve, and means controlled by said latter means to release said locking means.

4. In a ground trainer for aircraft flight personnel, means for simulating the operation of the hydraulic pressure pump of an airplane, a simulated hydraulic pressure indicator, a source of current, a relay operable in response to said pump simulating means for applying a potential from said source to said indicator to cause said indicator to show a pressure reading representative of the application of pressure from the pressure pump to the open-center hydraulic system of an airplane, means for simulating the operation of a hydraulically operable device, a control relay for controlling said latter means, a control operable by the pilot for operating said control relay, means for locking said control in its operated position representative of the hydraulically operated kick-out detent of the control valve of an airplane, means controlled by said latter relay for increasing the potential applied to said indicator from said source whereby said indicator is caused to show an increased reading representative of the increase of hydraulic pressure in the open-center system of an airplane incident to the operation of the control valve thereof, means operable under the control of said control relay upon the completion of the operation of the hydraulic device simulating means to further increase the potential applied from said source to said indicator representative of the building up of pressure in the control valve following the completion of the operation of the hydraulic device controlled thereby to force out the detent of the valve, means controlled by said latter means to release said locking means, means also controlled by said latter means to initiate the measurement of a predetermined time interval, and means effective if said locking means fails to release said control relay within the predetermined interval to further increase the potential applied from said source to said indicator representative of the building up of pressure in the open-center system to the point at which the relief valve of the open-center system opens.

5. In a ground trainer for aircraft flight personnel, means for simulating the operation of the hydraulic pressure pump of an airplane, a simulated hydraulic pressure indicator, a source of current, a relay operable in response to said pump simulating means for applying a potential from said source to said indicator to cause said indicator to show a pressure reading representative of the application of pressure from the pressure pump to the open-center hydraulic system of an airplane, means for simulating the operation of a hydraulically operable device, a relay for controlling the latter means, a control operable by a pilot for operating said latter relay, means for locking said control in its operated position representative of the operation of the hydraulically operated kick-out detent of the control valve of an airplane, means controlled by said latter relay for increasing the potential applied to said indicator from said source whereby said indicator is caused to show an increased reading representative of the increase of hydraulic pressure in the open-center system of an airplane incident to the operation of the control valve thereof, means operable upon the completion of the operation of the hydraulically operated device simulating means to further increase the potential applied from said source to said indicator representative of the building up of pressure in the control valve following the completion of the operation of the hydraulic device controlled thereby to force out the detent of the valve, means controlled by said latter means to release said locking means, and means effective upon the release of said control means to again apply said first potential to said indicator to cause said indicator to show a reduced pressure.

6. In a ground trainer for aircraft flight personnel, means for simulating the operation of the auxiliary motor driven pump of an airplane, means for simulating the operation of the engine driven pump of an airplane, a simulated hydraulic pressure indicator, a source of current, a relay operable in response to either of said simulating pump means for applying potential from said source to said indicator to cause said indicator to show a pressure reading representative of the application of pressure from the engine driven pump or from the motor driven pump to the open-center hydraulic system of an airplane, means for simulating the operation of a hydraulically operable device, a relay for controlling said latter means, a control operable by a pilot for operating said latter relay, and means for increasing the potential applied to said indicator from said source whereby said indicator is caused to show a changed reading representative of the change of hydraulic pressure in the open-center system of an airplane incident to the operation of a control valve thereof.

7. In a ground trainer for aircraft flight personnel, means for simulating the operation of the emergency hand pump of an airplane, a simulated hydraulic pressure indicator, a source of current, a relay intermittently operable in response to said pump simulating means for applying a potential from said source to said indicator representative of the application of pressure from said pump to the open-center hydraulic system of an airplane, means for simulating the operation of a hydraulically operable device, a relay for controlling said latter means, a control operable by a pilot for causing the intermittent operation of said latter relay in response to the operation of said first relay representative of the step-by-step manner in which the hydraulically operated device of an airplane would respond to hand pump operation, and means for increasing the potential applied to said indicator from said source whereby said indicator is caused to show a changed reading representative of the change of hydraulic pressure in the open-center system of an airplane incident to the operation of a control valve thereof.

8. In a ground trainer for aircraft flight personnel, means for simulating the operation of the auxiliary and engine driven pumps of an airplane, a relay operable in response to either of said pump simulating means representative of the application of pressure from either the engine driven or auxiliary pump to the open-center hydraulic system of an airplane, means for preventing the operation of said relay in simulation of the failure of the hydraulic system of an airplane, means for simulating the operation of the emergency hand pump of an airplane, means for simulating the operation of a hydraulically operable device, a relay for enabling the operation of said latter means, a control operated by a pilot for controlling said latter relay, and means operable to cause the intermittent operation of said device simulating means representative of the step-by-step manner in which said device would respond to the direct hand pump operation in an actual airplane.

9. In a ground trainer for aircraft flight personnel, means for simulating the operation of the auxiliary, engine driven and emergency hand pumps of an airplane, means for simulating the operation of the hydraulically operable wing flaps operating device of an airplane, a first relay for enabling the operation of said latter means, a second relay operable in response to any one of said pump simulating means representative of the application of hydraulic pressure from any one of the pumps to the open-center hydraulic system of an airplane, a control operable by a pilot for operating said first relay whereby said device simulating means becomes operable under the control of said second relay, means for simulating the air speed of a simulated flight, and means effective if the simulated air speed of a simulated flight is in excess of a predetermined value to prevent the operation of said first relay to thereby prevent the operation of said device simulating means representative of the inability of the wing flaps operating device of an airplane to lower the wing flaps against the pressure of the slip stream.

10. In a ground trainer for aircraft flight personnel, means for simulating the operation of the auxiliary, engine driven and emergency hand pumps of an airplane, means for simulating the operation of the hydraulically operable wing flaps operating device of an airplane, a first relay for enabling the operation of said latter means in a manner representative of the lowering of the wing flaps, a second relay for enabling the operation of said latter means in a manner representative of the raising of the wing flaps, a third relay operable in response to any one of said pump simulating means representative of the application of hydraulic pressure from any one of the pumps to the open-center hydraulic system of an airplane, a control operable by a pilot for operating either said first or said second relay whereby said device simulating means becomes operable under the control of said third relay, means for simulating the air speed of a simulated flight, and means effective if the simulated air speed of a simulated flight is in excess of a predetermined value to prevent the operation of said first relay to thereby prevent the operation of said device simulating means in a manner representative of the lowering of the wing flaps, and to cause the operation of said second relay to thereby cause the operation of said device simulating means in a manner representative of the raising of the wing flaps irrespective of the operated position of said control to simulate automatic movement of the wing flaps of an airplane to their raised positions due to the pressure of the slip stream.

11. In a ground trainer for aircraft flight personnel, means for simulating the operation of the auxiliary and engine driven pumps of an airplane, means for simulating the operation of the hydraulically operable devices of an airplane, first relays for enabling the operation of one of said latter means, second relays for enabling the operation of another of said latter means, a relay operable in response to any one of said pump simulating means representative of the application of hydraulic pressure from any one of the pumps to the open-center hydraulic system of an airplane, a first control operable by a pilot for operating either one of said first relays whereby said one device simulating means becomes operated under the control of said latter relay, a second control operable by a pilot for operating either one of said second relays whereby said other device simulating means becomes operable under the control of said latter relay, and circuit means effective to prevent the operation of either of said device simulating means if said controls are simultaneously operated.

12. In a ground trainer for aircraft flight personnel, means for simulating the operation of the auxiliary and engine driven pumps of an airplane, means for simulating the operation of the hydraulically operable landing gear operating device of an airplane, first relays for enabling the operation of said latter means, means for simulating the operation of the hydraulically operable wing flaps operating device of an airplane, second relays for enabling the operation of said latter device simulating means, a relay operable in response to any one of said pump simulating means representative of the application of hydraulic pressure from any one of the pumps to the open-center hydraulic system of an airplane, a first control operable by a pilot for operating either one of said first relays whereby said first device simulating means becomes operable under the control of said latter relay, a second control operable by a pilot for operating either one of said second relays whereby said second device simulating means becomes operable under the control of said latter relay, and circuit means effective to prevent the operation of either of said device simulating means if one of said first relays and one of said second relays are simultaneously operated by the simultaneous operation of said controls.

13. In a ground trainer for aircraft personnel, means for simulating the operation of the auxiliary, engine driven and emergency hand pumps of an airplane, means for simulating the operation of the hydraulically operable device for operating the landing gear of an airplane, a relay enabling the operation of said latter means in a manner representative of the lowering of the landing gear, a relay operable in response to any one of said pump simulating means representative of the application of hydraulic pressure from one of the pumps to the open-center hydraulic system of an airplane, a control operable by a pilot for operating said first relay whereby said device simulating means becomes operable under the control of said second relay, means for preventing the operation of said second relay in simulation of the failure of the hydraulic system of an airplane, and means operable to control said device simulating means independent of said second relay in simulation of the mechanical system provided in an airplane for lowering the landing gear.

14. In a ground trainer for aircraft flight personnel, means for simulating the operation of the auxiliary, engine driven and emergency hand pumps of an airplane, means for simulating the operation of the hydraulically operable device for operating the wing flaps of an airplane, a relay for enabling the operation of said latter means in a manner representative of the lowering of the wing flaps, a relay operable in response to any one of said pump simulating means representative of the application of hydraulic pressure from any one of said pumps to the open-center hydraulic system of an airplane, a control operable by a pilot for operating said first relay whereby said device simulating means becomes operable under the control of said second relay, and means operable to transfer the control of said device simulating means from said second relay directly to said emergency hand pump simulating means in simulation of the failure of said device to respond to the hydraulic pressure produced in the open-center system by either the auxiliary or engine driven pumps of an airplane and in simulation of the lowering of the wing flaps by direct hand pump operation.

15. In a ground trainer for aircraft flight personnel, means for simulating the operation of the auxiliary, engine driven and emergency hand pumps of an airplane, means for simulating the operation of the hydraulically operable device for operating the wing flaps of an airplane, a relay for enabling the operation of said latter means in a manner representative of the lowering of the wing flaps, a relay operable in response to any one of said pump simulating means representative of the application of hydraulic pressure from any one of the pumps to the open-center hydraulic system of an airplane, a control operable by a pilot for operating said first relay whereby said device simulating means becomes operable under the control of said second relay, means operable to transfer the control of said device simulating means from said second relay to said hand pump simulating means, and means operable by the pilot for operating said latter means in simulation of the operation of valves whereby the hand pump of an airplane is connected directly with the wing flaps operating device of an airplane whereby the wing flaps are lowered by direct hand pump operation when the wing flaps operating device fails to respond to pressure supplied thereto from the open-center hydraulic system.

16. In a ground trainer for aircraft flight personnel, means for simulating the operation of the auxiliary, engine driven and emergency hand pumps of an airplane, means for simulating the production of hydraulic pressure, indicators for simulating the indication of the hydraulic pressure in the constant pressure accumulators of an airplane, a relay operable in response to the operation of any one of said pump simulating means to control said pressure simulating means, a source of current, means controlled by said pressure simulating means for deriving a potential from said source and applying it to said indicators, and means controlled by said pressure simulating means for causing the release of said relay and the arresting of the operation of said pressure simulating means when said indicators show pressures of a predetermined value.

17. In a ground trainer for aircraft flight personnel, means for simulating the operation of the emergency hand pump of an airplane, means for simulating the production of hydraulic pressure, indicators for simulating the indication of the hydraulic pressure in the constant pressure accumulators of an airplane, a relay intermittently operable in response to the operation of said hand pump simulating means to control the intermittent operation of said pressure simulating means, a source of current, means controlled by the intermittent operation of said pressure simulating means for deriving an increasing potential from said source and for applying it to said indicators whereby said indicators are caused to show intermittently increasing readings, and means controlled by said pressure simulating means for causing the release of said relay and the arresting of the operation of said pressure simulating means when said indicators show pressures of a predetermined value.

18. In a ground trainer for aircraft flight personnel, means for simulating the operation of the auxiliary, engine driven and emergency hand pumps of an airplane, means for simulating the production of hydraulic pressure, an indicator for simulating the indication of the hydraulic pressure in the open-center portion of the hydraulic system of an airplane, indicators for simulating the indication of the hydraulic pressure in the constant pressure accumulators of an airplane, a first relay operable in response to the operation of any one of said pump simulating means to control said pressure simulating means, a source of current, means controlled by said pressure simulating means for deriving a potential from said source and for applying it to all of said indicators whereby said indicators show readings representative of the pressure in the accumulators prior to the operation of the unloading valve of an airplane, a second relay operable in response to the operation of any one of said pump simulating means, means controlled by said pressure simulating means for causing the release of said first relay to arrest the operation of said pressure simulating means when said indicators show pressures of a predetermined value, and to derive and apply a reduced potential to said first indicator under the control of said second relay whereby said first indicator shows a reading representative of the hydraulic pressure in the open-center portion of the hydraulic system of an airplane and said other indicators show hydraulic pressures in the constant pressure portion of the hydraulic system of an airplane following the operation of the unloading valve.

19. In a ground trainer for aircraft flight personnel, means for simulating the production of hydraulic pressure, indicators for simulating the indication of the hydraulic pressure in the constant pressure accumulators of an airplane, means for simulating the operation of the foot brakes of an airplane, means controlled by the repeated operation and release of said latter means for causing the intermittent operation of said pressure simulating means in a manner representative of the reduction of pressure in the constant pressure accumulators of an airplane incident to the operation of the brakes, a source of current, and means controlled by said pressure simulating means for deriving a decreasing potential from said source of current and for applying it to said indicators whereby said indicators are caused to show intermittently decreased readings representative of the decrease in pressure in the accumulators of an airplane incident to the repeated operation and release of the brakes.

20. In a ground trainer for aircraft flight personnel, means for simulating the production of hydraulic pressure, indicators for simulating the indication of the hydraulic pressure in the constant pressure accumulators of an airplane, means for simulating the operation of the foot brakes of an airplane, means controlled by the repeated operation and release of said latter means for causing the intermittent operation of said pressure simulating means in a manner representative of the reduction of pressure in the constant pressure accumulators of an airplane incident to the operation of the brakes, a source of current, means controlled by said pressure simulating means for deriving a decreasing potential from said source and for applying it to said indicators whereby said indicators are caused to show intermittently decreasing readings representative of the decrease in pressure in the accumulators of an airplane incident to the repeated operation and release of the brakes, and means controlled by said pressure simulating means when the simulated pressure has been reduced to a predetermined value for arresting the operation of said pressure simulating means and for causing said indicators to show zero pressure readings representative of the reduction of pressure in the accumulators to zero.

ROBERT O. RIPPERE.

REFERENCES CITED

The following references are of record in the file of this patent:

UNITED STATES PATENTS

| Number | Name | Date |
| --- | --- | --- |
| 1,655,244 | Rowell | Jan. 3, 1928 |
| 2,099,857 | Link | Nov. 23, 1937 |
| 2,164,412 | Koster | July 4, 1939 |
| 2,218,546 | Muller | Oct. 22, 1940 |
| 2,327,997 | Carmody | Aug. 31, 1943 |
| 2,343,945 | Weathers | Mar. 14, 1944 |
| 2,346,838 | Haight | Apr. 18, 1944 |
| 2,366,603 | Dehmel | Jan. 2, 1945 |
| 2,372,741 | Roberts | Apr. 3, 1945 |
| 2,395,477 | Gumley | Feb. 26, 1946 |
| 2,406,221 | Hornfeck | Aug. 20, 1946 |
| 2,428,767 | Albert | Oct. 14, 1947 |